United States Patent [19]

Demers

[11] 4,114,138
[45] Sep. 12, 1978

[54] SELECTIVE CALLING CIRCUIT

[75] Inventor: Robert Augustus Demers, Marlboro, Mass.

[73] Assignee: Bell Telephone Laboratories, Incorporated, Murray Hill, N.J.

[21] Appl. No.: 716,581

[22] Filed: Aug. 23, 1976

[51] Int. Cl.² ............................................. H04Q 9/00
[52] U.S. Cl. ......................... 340/147 R; 340/168 R; 340/168 CC; 340/164 R
[58] Field of Search ....... 325/55; 340/168 R, 168 CC, 340/147 MD, 147 R

[56] References Cited

U.S. PATENT DOCUMENTS

| | | | |
|---|---|---|---|
| 3,387,270 | 6/1968 | Adlhoch | 340/168 |
| 3,510,777 | 5/1970 | Gordon | 325/55 |
| 3,585,596 | 6/1971 | Rosenblatt | 340/168 |
| 3,634,826 | 1/1972 | Biedermann | 340/168 |
| 3,654,607 | 4/1972 | Wavre | 340/168 |
| 3,657,477 | 4/1972 | Ehrat | 340/168 CC |
| 3,836,887 | 9/1974 | Ueda | 340/168 X |
| 3,852,722 | 12/1974 | Neuville | 340/168 CC |
| 4,007,422 | 2/1977 | da Silva | 325/55 |

*Primary Examiner*—Harold I. Pitts
*Attorney, Agent, or Firm*—Richard B. Havill

[57] ABSTRACT

A selective calling circuit includes a central control code generator for generating a digital stream having repetitions of selected code words of digital information for selectively calling a plurality of remote receiving stations in this circuit. Each remote station includes a decoder for recognizing a predetermined sequence of digital information and reconstructing selected digital code words included therein.

A variable modulus counter, responsive to clock pulses and means for selectively varying the modulus of the counter, is included in the code generator at the central control station.

A resettable counter that counts in response to clock pulses and is reset in response to received code signals is included in the decoder at the remote station.

6 Claims, 7 Drawing Figures

SELECTIVE CALLING CIRCUIT

BACKGROUND OF THE INVENTION

The invention is a selective calling circuit that is more particularly described as an asynchronous circuit using consecutive repetitions of selected digital code words.

Selective calling systems are useful in many applications, one of which is for monitoring the status of equipment, such as protection switches, located at unmanned remote stations along a transmission line and for controlling operation of that equipment. Each remote station includes a selective calling decoder for determining whether or not a central control station is calling the particular remote station. In response to receipt of a call, the remote station responds by either transmitting information regarding the status of some equipment or condition at the remote station, or by applying a control signal to equipment located at the remote station.

For the remote station, a wide variety of selective calling arrangements have been described in the prior art. They include multiple frequency selection schemes, synchronous digital code schemes, and repetitive asynchronous digital schemes. Designers having turned from multiple frequency schemes to digital code schemes because the multiple frequency schemes require complicated base station equipment when the system is arranged to call a large number of remote station codes. The digital code scheme arrangements disclosed in the prior art generally require complicated timing arrangements for both the central control station and the remote station.

The prior art arrangements generally are complicated and have the disadvantage of high cost. Some selective calling arrangements, for monitor and control systems requiring only a few calling codes, may be prohibitively expensive when complicated arrangements of the prior art are used. Thus, there is a need for an uncomplicated selective calling system that will selectively call a small number of remote station codes at a low cost.

Therefore it is an object to provide a simple selective station calling arrangement using a simple coding scheme.

It is another object to provide a low cost selective station calling arrangement.

It is a further object to provide an asynchronous selective calling arrangement.

It is still another object to provide a selective calling arrangement using a code without framing.

SUMMARY OF THE INVENTION

These and other objects are realized by a selective calling circuit including a variable modulus counter that generates a digital pulse stream having repetitions of selected code words of digital information. A plurality of receiving stations are arranged to receive the digital code words. Each receiving station includes a decoder for recognizing a predetermined sequence of digital information and for reconstructing the selected digital code words included therein.

It is a feature of the invention to use a repetitious stream of digital code words for selectively calling a remote station.

It is another feature to repeat variable length digital code words for selectively calling a remote station.

It is still another feature to use a variable modulus counter for generating variable length digital code words.

It is yet another feature that each different code word includes a different number of bits $n$, one bit of each code word having a first state and $n-1$ bits of each code word having an opposite state.

It is a further feature to use a resettable counter, reset in response to 1-out-of-$n$ signals, for reconstructing individual digital code words from a repetitious stream of variable length code words.

It is a still further feature to selectively signal one of a group of remote stations without employing framing signals.

BRIEF DESCRIPTION OF THE DRAWINGS

These and other features of the invention will be better understood by reading the following detailed description with reference to the attached drawings wherein.

DETAILED DESCRIPTION

Figure 1:
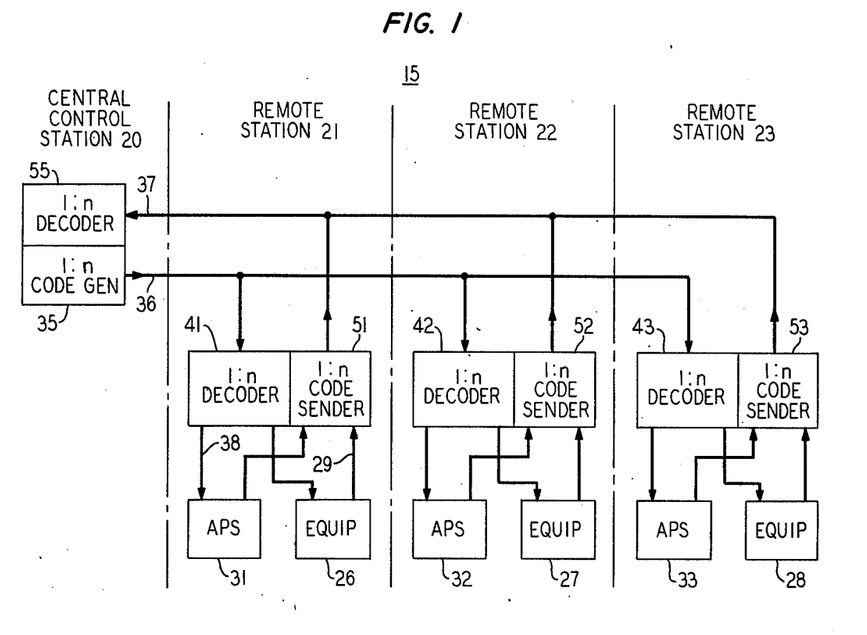
FIG. 1 is a block diagram of a selective calling circuit.

Referring now to FIG. 1, there is shown an asynchronous telemetry system 15 used for selectively calling from a central control station 20 to one or more of a plurality of unmanned remote stations 21, 22 and 23. The system 15 is used advantageously for monitoring the status of equipments 26, 27 and 28 at the remote stations and for controlling automatic protection switches 31, 32 and 33 located, respectively, at the remote stations 21, 22 and 23. A 1-out-of-$n$ (1:$n$) code generator 35 located at the central control station 20 and 1:$n$ decoders 41, 42 and 43, each located at a different one of the remote stations, provide a simple low cost arrangement of a limited capacity telemetry system.

The status of selected conditions of equipments 26, 27 and 28 at the various remote stations is determined by an inquiry and response procedure. Each remote station is assigned a unique identification code. Questions to be asked by the central control station 20 are each assigned a unique inquiry code. All of the remote stations 21, 22 and 23 use the same set of reply codes for transmitting status reports back to the central control station 20.

In monitoring the status of equipment 26, the central control station generates an identification and inquiry code which is sent from the 1:$n$ code generator 35 at the central control station 20 by way of a transmission line 36 to the remote stations 21, 22 and 23. Station 21 includes the 1:$n$ decoder 41 which is uniquely designed to respond to the transmitted identification code for equipment 26. Decoder 41 therefore responds to the transmitted inquiry code by enabling the requested status of equipment 26 to be applied by way of lead 29 to a 1:$n$ code sender 51. To report the status, the 1:$n$ code sender 51 generates and sends a reply code that is associated with the status to be reported. This reply code is transmitted over another transmission line 37 back to the central control station 20 where it is received, decoded and latched for display by a 1:n decoder 55. A similar sequence can be repeated for equipments 27 and 28 in remote stations 22 and 23 by causing the 1:n code generator 35 to generate and transmit different identification codes with the same or a different inquiry code.

Control of the automatic protection switches (APS) 31, 32 and 33 is accomplished by sending a command code from the central control station 20 to the remote stations 21, 22 and 23. By choice of the designer, all of the remote stations can decode and respond to the command being transmitted. In such a case, the 1:n decoders all must be arranged to respond to the same command code. Such a command may, for example, initiate a procedure to reset the automatic protection switches. Also, by choice of the designer, selected commands may be used by only one of the remote stations. If the command is for a specific remote station, such as the station 21, that station must be identified by the transmission of its identification code together with the appropriate command code. Thus a command, identified for the station 21, is decoded by the 1:n decoder 41 and causes a change in a logic level being applied by way of lead 38 to the automatic protection switch 31 located at the station 21.

Figure 2:
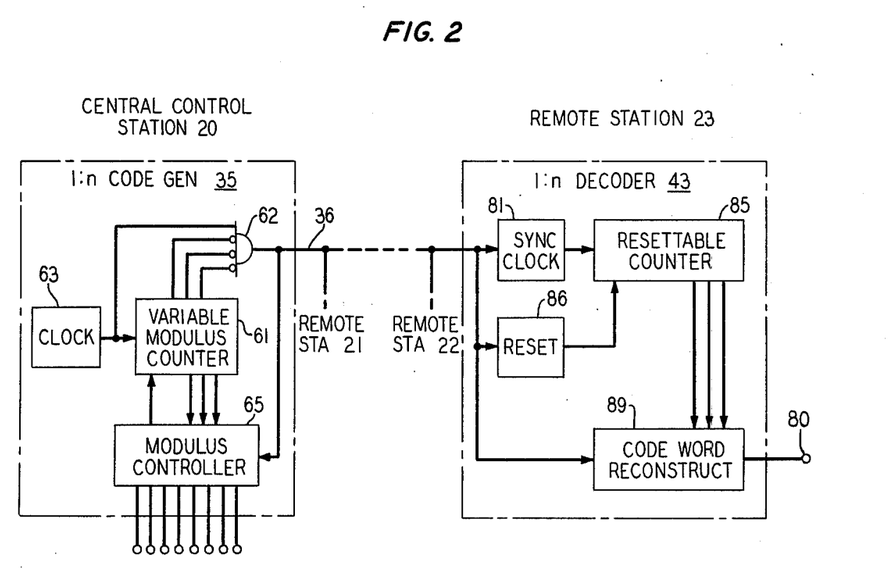
FIG. 2 is a block diagram of a code generator and a decoder used in the selective calling circuit of FIG. 1.

Referring now to FIG. 2, there is shown in greater detail the interconnection of the 1:n code generator 35 with the 1:n decoder 43. In the code generator 35, an N-bit variable modulus binary counter 61 together with an output gating circuit produces 1:n code words on the transmission line 36 in response to locally produced generator clock pulses. The 1:n code words include words having 1-out-of-n bits in a high state while all remaining n−1 bits are low. In the resulting code, any particular word may include any number of bits from one bit to $2^N$ bits, where N equals the number of stages in the variable modulus counter 61. Each different code word includes a different number of bits n, one bit of each code word having a first state and n−1 bits of each code word having an opposite state. An AND gate 62, responsive to the outputs of the variable modulus counter 61 and to a clock 63, produces code word signals on the transmission line 36. In the 1:n decoder 43, the code words transmitted over the transmission line 36 are applied to a synchronous clock 81, a reset circuit 86 and a code word reconstructing circuit 89, which operate together with a resettable counter 85, for producing reconstructed code words on lead 80.

Figure 3:
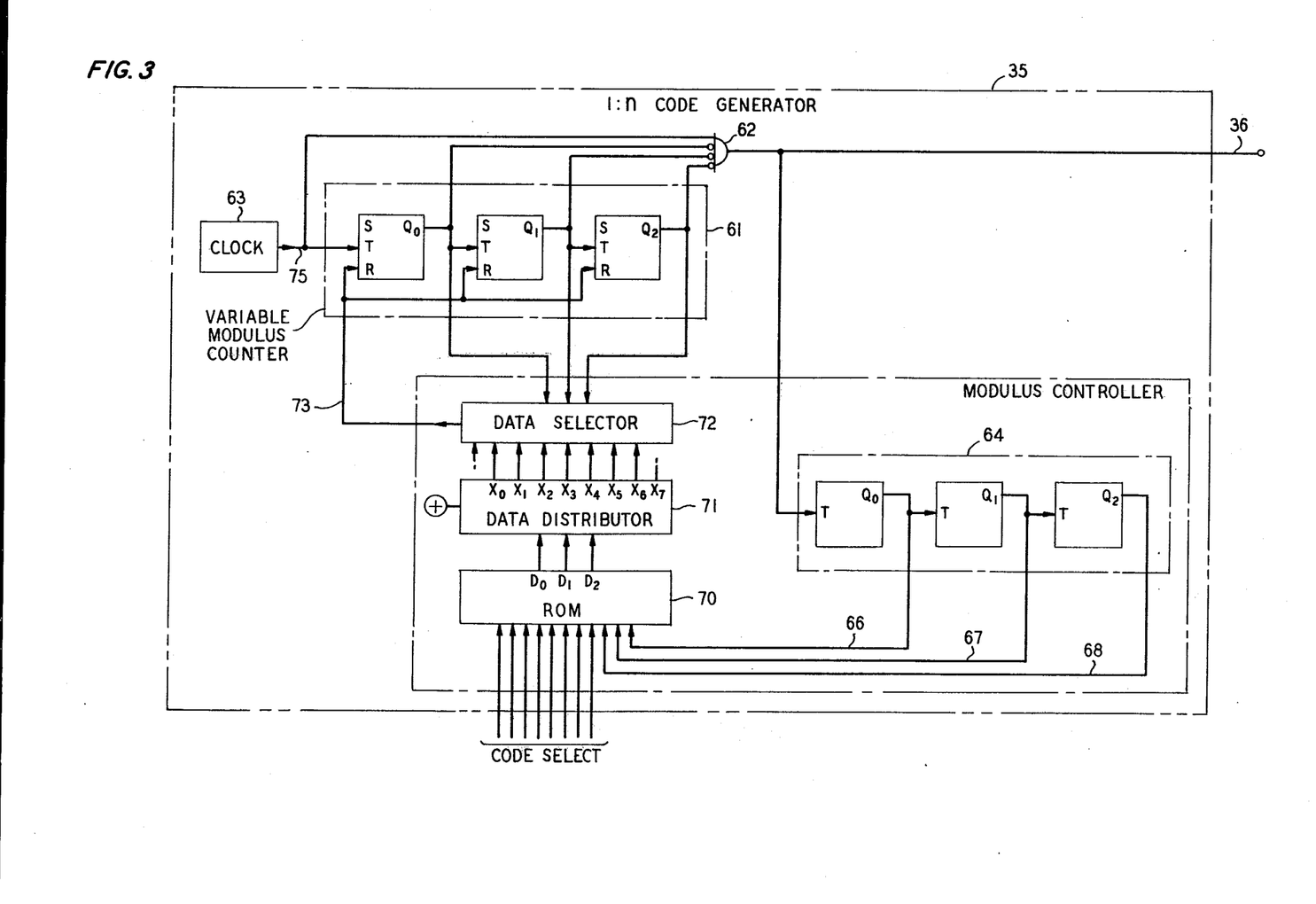
FIG. 3 is a block diagram of a variable length digital code word generator used in the selective calling circuit of FIG. 1.

In FIG. 3, the code generator 35 is shown in greater detail. The variable modulus binary counter 61 is a conventional three stage ripple counter arrangement having the least significant bit at the left and the most significant bit at the right. The count state of the counter 61 is incremented in response to each negative-going transition of clock pulses produced by a local clock 63. Timing races are avoided in the code generator by making all changes of state in the counter occur on negative-going clock transitions. Thus the counter reaches a steady-state condition before logic decisions are made during an interval when the clock is "high".

The variable modulus binary counter 61 output gating circuit includes an AND gate 62 having an inverted input connected to the output of each stage of the counter and a noninverted input connected to the output of the clock 63. The AND gate 62 responds to the inverted inputs and to the code generator local clock pulses. An output pulse produced by the 1:n code generator 35 is produced in response to the all zero state of the variable modulus counter 61 and the local clock pulse from clock 63. Thus the AND gate 62 produces a positive polarity code generator output pulse during the interval of the first clock pulse following the occurrence of the all zero state in the variable modulus counter.

The resulting code generator output pulse and all subsequently generated output pulses are applied to the transmission line 36 for transmission to the decoders 41, 42 and 43 connected along the line, as shown in FIG. 1. Referring again to FIG. 3, these output pulses also are applied to the trigger input T of the first stage of a modulo-M counter 64, which is connected in a feedback arrangement for the variable modulus counter 61. This feedback arrangement includes logic for determining at any time the modulus of the variable modulus counter 61. The code, generated by the code generator 35, is determined by which of several possible feedback conditions is coupled to the variable modulus counter 61.

The modulo-M counter 64 counts the output pulses of the code generator 35 and controls a sequence of up to M 1:n code patterns. Counter 64 changes states on negative-going transitions of output pulses on line 36. Leads 66, 67 and 68 from the outputs of the stages of the modulo-M counter are connected directly to different ones of the address inputs of the read only memory (ROM) 70 also included in the feedback arrangement. The state of the modulo-M counter 64 together with a code select word of S bits, applied to a group of leads CODE SELECT, controls the modulus of the variable modulus counter 61.

For an example, consider that the ROM 70 is a conventional unit including 2048 words of three bits each. ROM addressing is accomplished by the state bits from the modulo-M counter and the S bits of the code select word. The state bits of the modulo-M counter control the three low order address bits of the ROM. The eight high order address bits of the ROM are controlled by the code select word.

In the circuit of FIG. 3, N = 3, M = 8, and S = 8, and the circuit works in the following manner. In response to the address code word, the ROM produces a first three bit ROM output code word on leads $D_0$, $D_1$ and $D_2$. This ROM output code word controls the modulus of the variable modulus counter 61 for determining the 1:n pattern to be produced by the code generator 35. The ROM output code word is applied to the control inputs of a data distributor circuit 71 for determining which one of eight outputs $X_0 - X_7$ is made high. This data distributor 71 is a conventional tree-distribution circuit wherein the input, a logic "1", is distributed to one of the eight output branches of the tree.

The seven least significant output branches of the data distributor 71 are connected directly to seven most significant input branches of a data selector, or conventional tree-selection circuit, 72. The three control inputs of the data selector 72 are connected to outputs $Q_0$, $Q_1$, and $Q_2$ of the variable modulus counter 61 and are controlled by the count state of that counter.

As the variable modulus counter 61 is incremented through the usual count states in response to the sequence of clock pulses from the clock 63, a counter state is reached wherein the count state, applied by the variable modulus counter to the data selector 72 is equal to one more than the ROM output code word being applied to the data distributor 71. When such a match occurs, a reset pulse is produced on lead 73 from the trunk of the data selector, or tree-selection circuit, 72. This reset pulse resets the variable modulus counter 61 to an all zero state.

With the variable modulus counter in this all zero state, the next generator clock pulse applied by way of lead 75 causes an output pulse to be produced by the AND gate 62, as previously described. In addition to being transmitted along the line 36 to the decoder 43, shown in FIG. 2, the output pulse increments the modulo-M counter 64.

As a result of incrementing the modulo-M counter to a new count state, a different address is applied to the ROM causing a second ROM output code word to be read from the ROM. Assuming that this second ROM output code word is a different binary combination that the first ROM output code word, the match between the count state of the variable modulus counter 61 and the second ROM output code word occurs at a different time during the sequence of generator clock pulses. As a result, the reset pulse for the variable modulus counter 61 occurs at a different time slot than the first ROM output code word. Thus two different 1:$n$ code words are produced in sequence by the code generator 35.

Although the exemplary 1:$n$ code generator of FIG. 3 includes specific sizes of counters and the ROM, other sizes will also work. In general, the ROM should have $2^SM$ words of N bits each.

Figure 4:
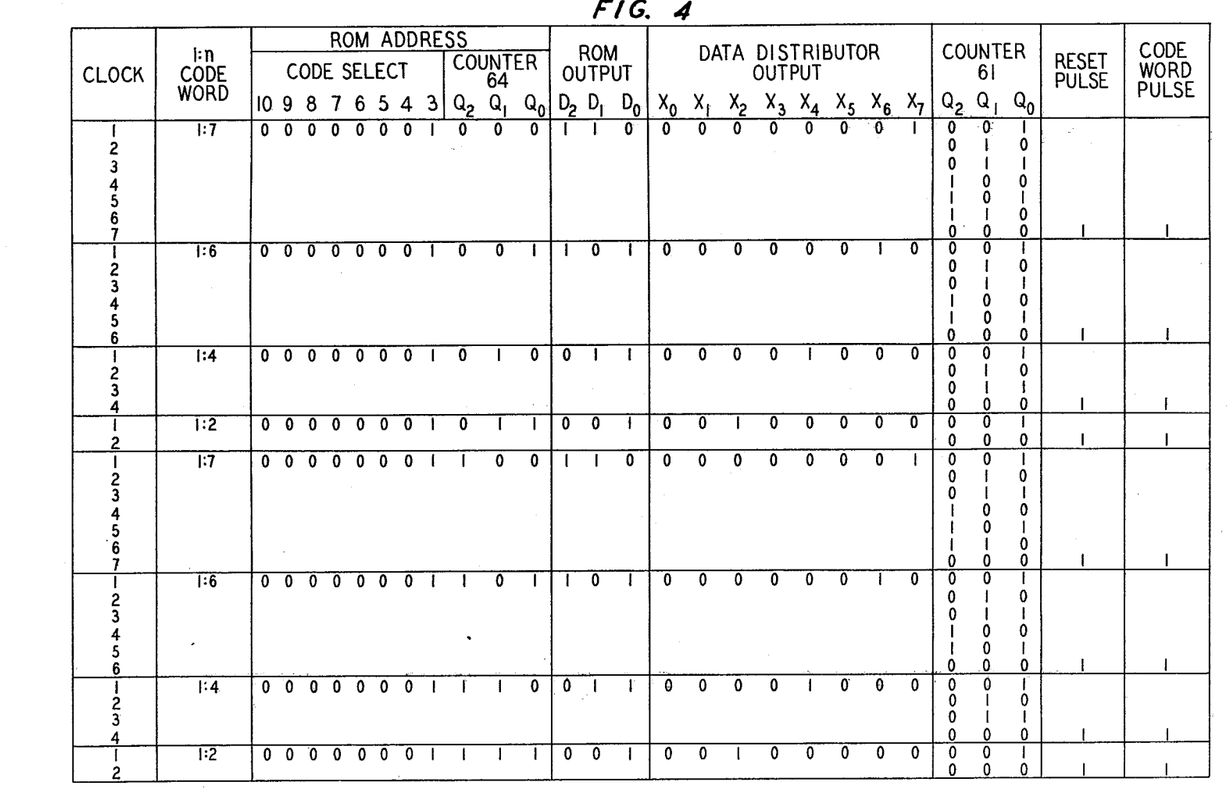
FIG. 4 is a table of codes showing logic states for the digital code word generator of FIG. 2.
Figure 5:
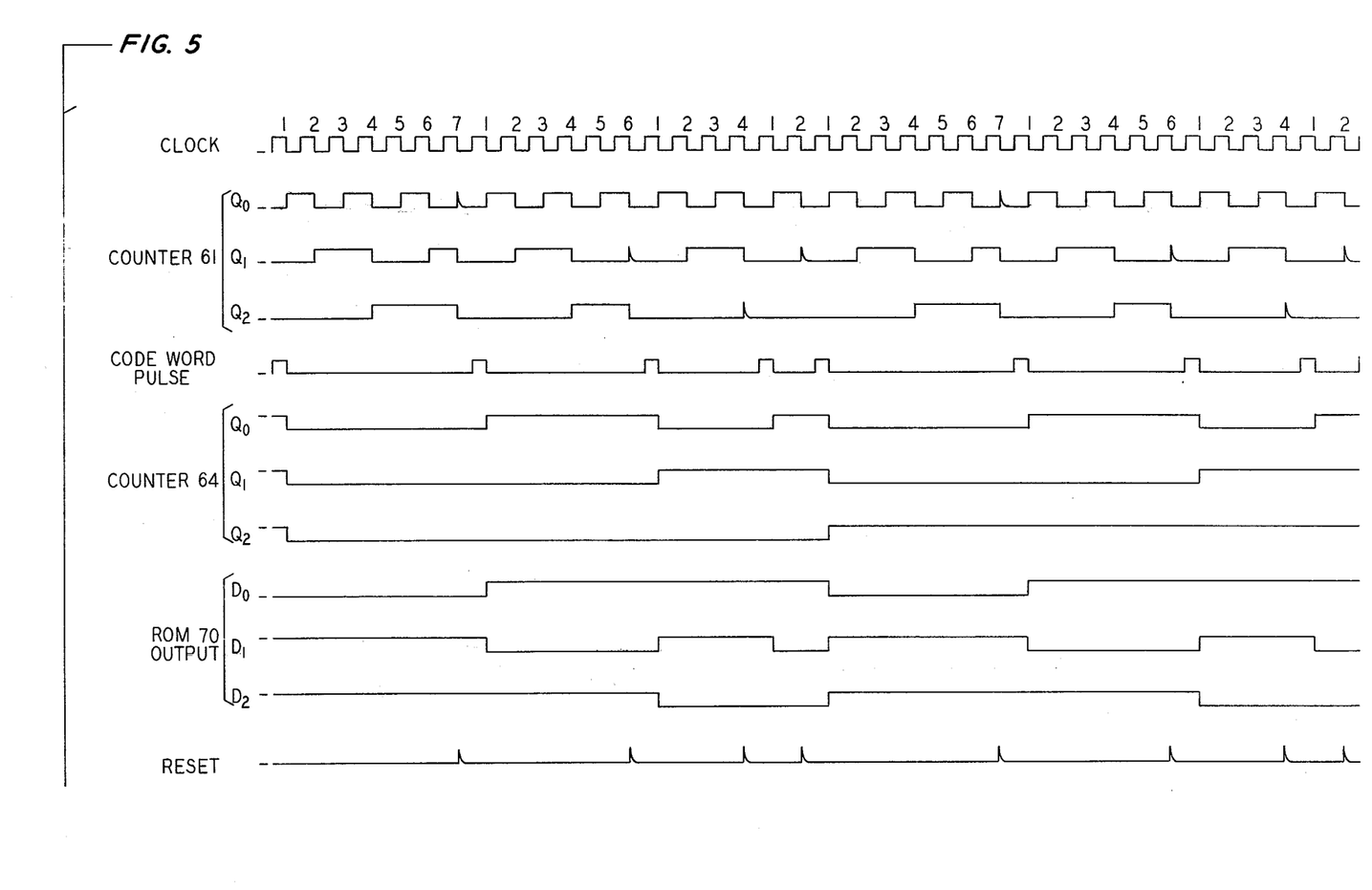
FIG. 5 is a timing diagram for the digital code word generator of FIG. 3.

Referring now to FIGS. 4 and 5, there is shown a sequence of operating conditions of the code generator 35 as it repeats a four code word sequence 1:7, 1:6, 1:4, 1:2. It is noted that each different code word includes a different number of bits $n = 7$, $n = 6$, $n = 4$, and $n = 2$.

FIG. 4 is a logic table showing states within the code generator 35 as it steps through the code word sequence. The leftmost column designated "CLOCK" indicates the number of clock pulses since the last prior output pulse with time increasing from the top of the table toward the bottom. The column entitled "1:$n$ CODE WORD" indicates which of the four code words is being generated during the interval of time between the line on which the code word appears and the line above the next subsequent code word. "ROM ADDRESS" is given in two parts, including eight CODE SELECT bits and three bits indicating the state of counter 64. The states of the output of the ROM are shown in the column headed "ROM OUTPUT".

Also in FIG. 4, there is shown a column headed "DATA DISTRIBUTOR OUTPUT" showing which one of eight outputs of the data distributor 71 is high during the interval between the line upon which the distributor state is shown and the line preceding the occurrence of the next different distributor output. It is noted that the outputs of the distributor 71 are designated by $X_i$, each X having a subscript decimal number. The decimal number of the output which goes high is one more than the decimal value of the binary output of the ROM 70.

In the column designated "COUNTER 61" there is shown the sequence of counter states which occur in response to clock pulses applied to the counter 61 from the clock 63.

The states of the ROM ADDRESS, the ROM OUTPUT and the DATA DISTRIBUTOR OUTPUT remain constant while the counter 61 is incremented through a series of states until it is reset to the all zero state. The several stable states of the ROM ADDRESS, the ROM OUTPUT and the DATA DISTRIBUTOR OUTPUT are omitted from the table of FIG. 4 because they do not change from the earlier states and for clearly presenting when significant changes of state occur in the sequence.

At the righthand end of the table of FIG. 4, the columns, designated "RESET PULSE" and "CODE WORD PULSE", respectively, show when reset and code word pulses occur in the operating sequence.

The contents of the ROM 70 are stored so that the code select data 00000001, applied to the address leads of the ROM, generates ROM outputs 110, 101, 011, 001, 110, 101, 011, and 001 as the state of the counter 64 is incremented eight times in response to output pulses on lead 36. Because the counter 64 is a modulo-8 counter, there are eight code words in the sequence. The example sequence of code words, however, is limited to a sequence of four different code words repeated twice and the ROM output sequence likewise is repeated twice.

As long as the same code select data is applied to the ROM address leads, the code generator will continuously repeat the same sequence of eight code words. When the code select data is changed, different sequences of code words are generated. Such different sequences of eight code words can be used either to identify one of the remote stations shown in FIG. 1, to command one of the remote stations to take some responsive action, or to request transmission of some information from a selected remote station to the central control station.

FIG. 5 is a timing diagram for the 1:$n$ code generator 35 of FIG. 3. In FIG. 5, clock signals from the clock 63 are shown at the top of the diagram. Time progresses from left to right. Numbers also written across the top of the diagram indicate the number of clock pulses since the last prior output pulse, as indicated in the vertical direction in FIG. 4.

States of the counter 61 are shown on the horizontal axes designated COUNTER 61 ($Q_0$, $Q_1$, $Q_2$). The counter 61 is reset by the pulses indicated on the axis designated RESET.

States of the counter 64 are shown on the axes designated COUNTER 64 ($Q_0$, $Q_1$, $Q_2$).

It is noted that in FIG. 5 changes of state of the counters 61 and 64 all occur on negative-going transitions of the clock pulses.

The output of the ROM is shown on lines designated ROM 70 OUTPUT ($D_0$, $D_1$, $D_2$).

Output pulses, which are generated and applied to transmission line 36 of FIG. 3, are shown in FIG. 5 on the axis designated CODE WORD PULSE. It is noted that there is only one high level output pulse in several time slots. The number of time slots is $n$. It also is noted that the output pulses occur in a repetitive pattern 1:7, 1:6, 1:4, 1:2, which is the same pattern used in the example relating to the logic table of FIG. 4.

As long as the code select word applied to the ROM 70 remains unchanged, the code generator will repeat the same sequence of code words. In the arrangement of FIG. 3, for each CODE SELECT input there will be M ROM addresses accessed to generate M 1:$n$ code words. The resulting code sequence will be (1:$n_1$), (1:$n_2$) . . . (1:$n_M$), wherein all $n_i$ are between one and $2^N$ and wherein M is less than or equal to $2^N$.

By applying different CODE SELECT inputs, different sequences are generated. The number of different sequences C which can be generated is $$C = \sum_{i=1}^{M} \binom{2^N}{i} \triangleq \sum_{i=1}^{M} \frac{2^N!}{i!(2^N - i)!} =$$

$$\sum_{i=1}^{M} \frac{2^N(2^N - 1)\cdots(2^N - i + 1)}{i(i-1)\cdots(i-i)}$$

= summation of combinations of $2^N$ taken $i$ at a time.

See for example, Chemical Rubber Company Standard Mathematical Tables, 14th Edition, page 392.

Because of the method of detection employed in the detector to be described, the order of the code words does not matter. The significance of the code words is entirely dependent upon the presence or absence of any particular $1{:}n_i$ code.

It is to be noted that the modulus of the modulo-M counter can be any number from one to $2^N$. Additionally, the modulus of the modulo-M counter may be fixed, as shown in the illustrative embodiment, or can be varied by external control.

Figure 6:
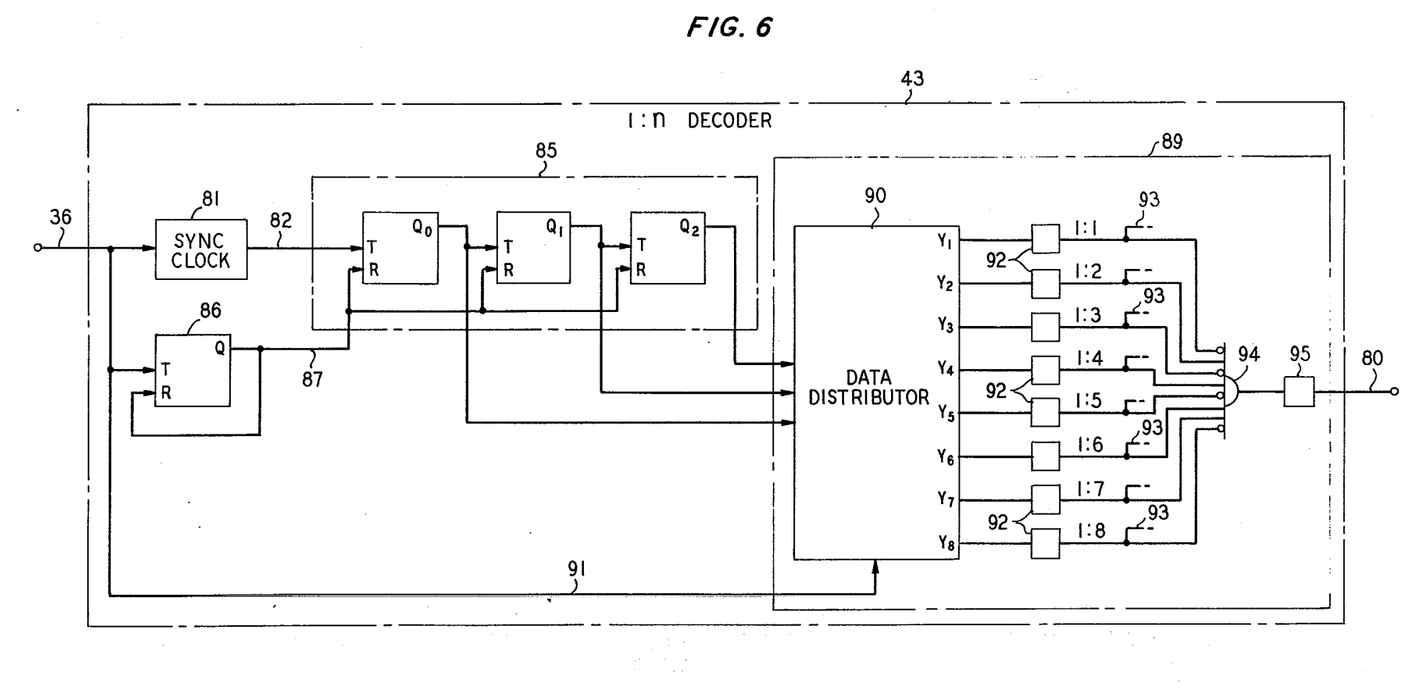
FIG. 6 is a block diagram of a 1:$n$ decoder used in the selective calling circuit of FIG. 1.

Referring now to FIG. 6 there is shown the decoder 43 of remote station 23, which receives code word signals on an input lead that is connected to the transmission line 36. Upon receipt of and the decoding of a received message, an output signal is produced by the decoder 43 on an output lead 80.

In the decoder, a clock signal is extracted from the received message by a synchronous clock 81 which produces a continuous sequence of clock pulses that occur in all time slots of the received code words. The synchronous clock 81 can be any one of a number of known clock recovery arrangements, one of which is a phase-locked loop. The clock 81 produces a clock signal on lead 82 in each time slot regardless of whether or not an input pulse appears on the transmission line 36 in that time slot.

A resettable N bit counter 85 is arranged to count the number of spaces between pulses in the received $1{:}n$ code words. Resetting of the counter 85 is accomplished by a single resettable flip-flop 86 which produces a reset pulse for resetting the counter 85 and itself on the negative-going edge of each received code word pulse. Between code word pulses, the clock pulses from the synchronous clock 81 are applied to the counter 85 and are counted until a reset pulse occurs on lead 87. Thus, at any time, the contents of the counter 85 represent the number of empty time slots in the code sequence received on the transmission line 36 since the last received code pulse. The states of the counter 85 are applied by way of output leads to the code word reconstructing circuit 89.

In the code word reconstructing circuit 89, data distributor 90 is arranged to produce a pulse on one of its outputs, which is determined by the state of the counter 85 when each received code pulse is applied to the decoder. The data distributor 90 is a tree-selector circuit which produces an output signal on a different one of several output leads in response to control signals generated by the outputs $Q_0$, $Q_1$, $Q_2$ of the stages of the counter 85. If, for example, a 1:7 code is received by the decoder, the data selector will produce an output pulse on its 1:7 output when the counter is in its state 110 and the input 1:7 code word pulse is received by the decoder 43.

Figure 7:
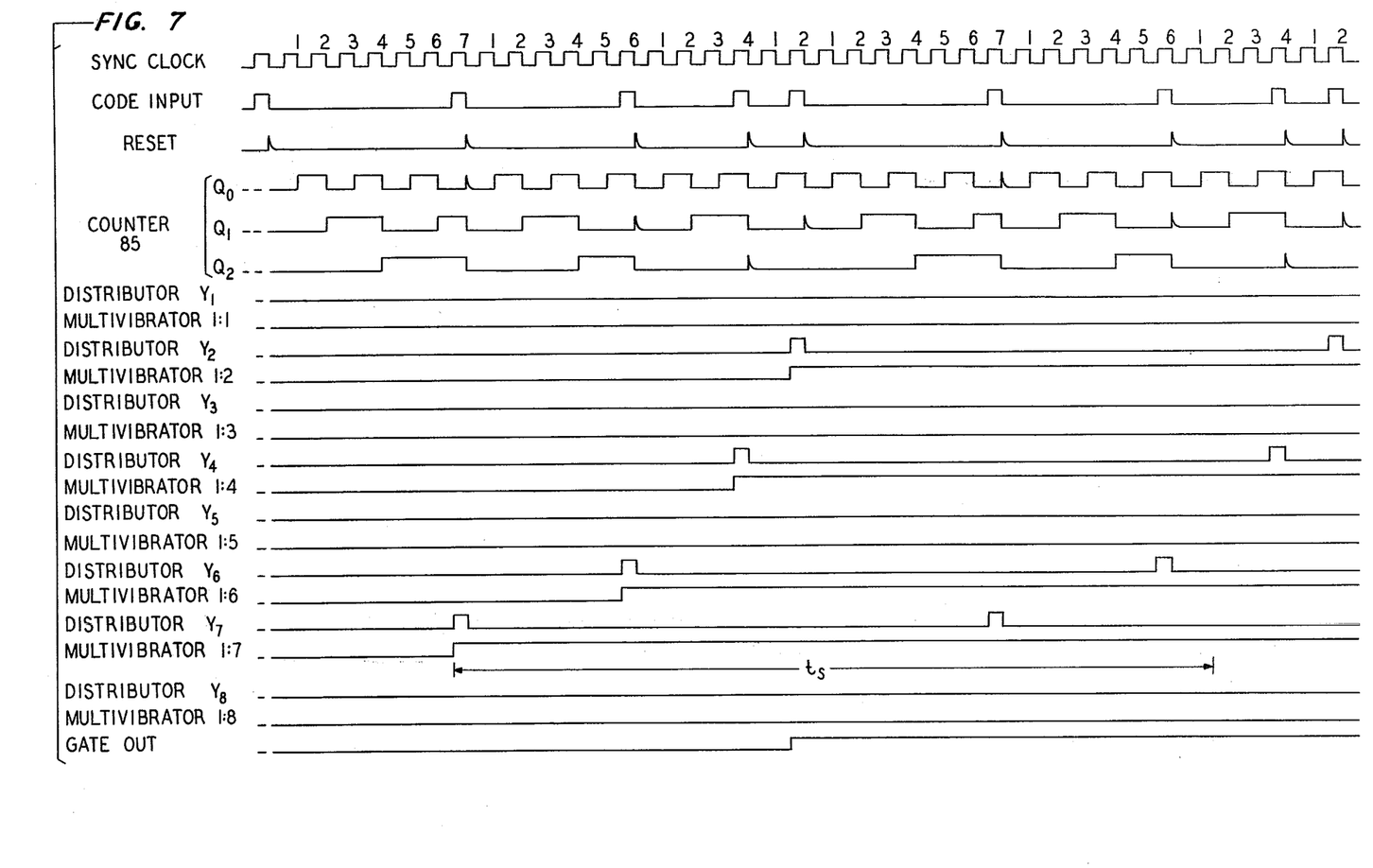
FIG. 7 is a timing diagram for the 1:$n$ decoder of FIG. 6.

Referring now to FIG. 7, there is shown a timing diagram for the decoder 43 of FIG. 6. The upper waveform in FIG. 7 shows the output of the synchronous clock 81 of FIG. 6. The second and third waveforms, respectively, show the code word input sequence and resulting reset pulses that occur on the negative-going transition of the code word pulses. Count states of the counter 85 are shown on horizontal axes designated COUNTER 85 ($Q_0$, $Q_1$, $Q_2$).

It is noted that for each $1{:}n$ code word present in a message, a pulse appears at the appropriate output terminal of the data distributor 90. These output terminals are designated $Y_1 \ldots Y_8$ in FIG. 6. In FIG. 7 a similar designation prefaced by DISTRIBUTOR is used to identify the output signal of the respective distributor terminals.

The received pulse stream from the transmission line 36 of FIG. 6 is applied by way of a lead 91 to the signal input of the data distributor 90 and is gated through the distributor to an output determined by the count state of counter 85. An output pulse then appears on the selected one of the output terminals $Y_1 \ldots Y_8$. For example, see the pulses which are shown as DISTRIBUTOR $Y_7$, DISTRIBUTOR $Y_6$, DISTRIBUTOR $Y_4$, and DISTRIBUTOR $Y_2$ in FIG. 7. The exemplary signals, given in FIG. 7, correlate with the exemplary generated code sequence shown in FIGS. 4 and 5. Therefore, other outputs DISTRIBUTOR $Y_1$, $Y_3$, $Y_5$, $Y_8$ of the data distributor 90 of FIG. 6 are shown in FIG. 7 without any pulses indicating that the code sequence received by decoder 43 excluded those code words.

In accordance with FIG. 7, the output signals of the data distributor 90 are pulses which in the arrangement of FIG. 6 must be stretched into constant level signals to indicate the reception of a given code. A different retriggerable one-shot multivibrator 92 is connected to each output terminal of the data distributor 90 for stretching the output pulses over a duration $t_s$ that is slightly longer than the longest interval expected between successive ones of the $1{:}n$ code words. Multivibrators 92 have an astable state duration equal to $t_s$. As shown in FIG. 7, $t_s$ is an interval starting with one pulse on distributor $Y_7$ and terminating after the next occurrence of a pulse on distributor $Y_7$. Stretched output pulses from the multivibrators are shown in FIG. 7 where they are designated, respectively, MULTIVIBRATOR 1:1, etc.

For the example of the sequence 1:7, 1:6, 1:4, 1:2, the distributor outputs $Y_7$, $Y_6$, $Y_4$, and $Y_2$ repeatedly generate pulses in response to their corresponding received code words. The multivibrators connected to data distributor outputs $Y_7$, $Y_6$, $Y_4$, and $Y_2$ are repeatedly triggered into their astable states producing the continuously high output signals on leads 1:7, 1:6, 1:4, and 1:2 of FIG. 6. Output signals on the other output leads 1:1, 1:3, 1:5, and 1:8 remain low, in accordance with the code sequence received from transmission line 36.

Combinational logic determines whether or not a predetermined code word sequence is received by the decoder 43. All of the output leads of the multivibrators 92 are directly connected to the inputs of an AND gate 94. Outputs 1:1, 1:3, 1:5, and 1:8 of the multivibrators, which are to remain low for the selected exemplary sequence 1:7, 1:6, 1:4, 1:2, are connected to inverting inputs of the AND gate 94. Thus the AND gate will produce an output only when the correct combination of code words is received.

Multiple logic gates can be connected to the multivibrator outputs, as shown by multiple leads 93.

One or more code sequences are assigned to each of the remote stations 21, 22, and 23 and to the control station 20 of FIG. 1. At a remote station when all patterns in a message are received, a delay is initiated for insuring that no new patterns arrive and change the message before detection is completed at the remote station. This time delay is accomplished by inserting a delay unit in each output path of the combinational logic unit for preventing erroneous detection, as message codes, of any short duration patterns caused by error bursts or any random signals on the line.

In FIG. 6, the output of the AND gate 94 is delayed from going high by a delay unit 95. The delay time $t_D$ is an interval that is longer than the longest possible code sequence expected to be received by the decoder 43.

The foregoing describes an illustrative embodiment of the invention. In view of that description, additional embodiments thereof will be obvious to those skilled in the art. The above-described embodiment, together with those additional embodiments, are considered to be within the scope of the invention.

What is claimed is:

1. An asynchronous telemetry circuit comprising a 1-out-of-$n$ (1:$n$) digital code generator including
   a generator clock,
   a variable modulus counter connected to the generator clock and arranged for counting in response to signals from the generator clock,
   means connected to the variable modulus counter for varying the modulus of the variable modulus counter,
   means connected to the variable modulus counter and to the generator clock and responsive to the states of the variable modulus counter and to signals from the generator clock for producing at an output of the code generator a repetitious stream of 1:$n$ digital code word signals, wherein each different code word includes a different number of bits $n$;
   means connected to the output of the code generator for transmitting the digital code word signals from the generator to a 1:$n$ decoder; and
   the 1:$n$ decoder including
      a decoder clock connected to an output of the transmitting means for producing decoder clock signals synchronized with received digital code words,
      a resettable counter connected to the decoder clock and responsive to the decoder clock signals for stepping through predetermined states,
      means connected to the output of the transmitting means responsive to the 1:$n$ digital code word signals for producing a signal for resetting the resettable counter, and
      means connected to the output of the transmitting means and to the output of the resettable counter and responsive to the repetitious stream of 1:$n$ digital code word signals and to the state of the resettable counter for reconstructing predetermined individual digital code words.

2. An asynchronous telemetry circuit, in accordance with claim 1, wherein the variable modulus counter comprises
   a digital counter including a plurality of feedback conditions for selectively bypassing states of the counter, and
   means for selectively enabling a first one of the feedback conditions and subsequently selectively enabling a second one of the feedback conditions.

3. A variable length code word generator comprising
   a generator clock,
   a variable modulus counter connected to the generator clock and arranged for counting in response to signals from the generator clock,
   means connected to the variable modulus counter for varying the modulus of the variable counter, and
   means connected to the variable modulus counter and to the generator clock and responsive to the states of the variable modulus counter and to signals from the generator clock for repeatedly producing at an output of the code word generator a sequence of variable length code words, each different code word includes a different number of bits $n$, one bit of each code word having a first state and $n-1$ bits of each code word having an opposite state.

4. A variable length word decoder comprising
   means for receiving a sequence of signals representing variable length code words,
   means for producing periodic signals in response to the sequence of code word signals,
   a resettable counter responsive to the periodic signals for stepping through a sequence of states,
   means responsive to the sequence of code word signals for resetting the counter, and
   means responsive to the sequence of code word signals and the sequence of states for determining which code word has been received, each different code word in a sequence includes a different number of bits $n$, one bit of each code word having a first state and $n-1$ bits of each code word having an opposite state.

5. A variable length word decoder in accordance with claim 4 further comprising means responsive to states of the counter for reconstructing individual words and stretching, combining, and delaying the code word signals for identifying a predetermined sequence of code words.

6. A variable modulus counter comprising
   a digital counter including a plurality of feedback paths for selectively changing feedback conditions applied to the counter,
   means for selectively enabling a first one of the feedback paths applying a first feedback condition to the counter and subsequently selectively enabling a second one of the feedback paths applying a second feedback condition to the counter, and
   means responsive to the states of the counter for producing a sequence of 1-out-of-$n$ (1:$n$) code words, wherein $n$ is a different number for each different code word.

* * * * *